United States Patent
Zhang et al.

(10) Patent No.: US 10,596,606 B2
(45) Date of Patent: Mar. 24, 2020

(54) IN-SITU DETOXIFICATION METHOD FOR HEAVILY CONTAMINATED SITE BY HEXAVALENT CHROMIUM, CHROMIUM SOIL REMEDIATION MICROBIAL AGENT AND PREPARATION METHOD THEREOF

(71) Applicant: QINGDAO TECHNOLOGICAL UNIVERSITY, Qingdao, Shandong (CN)

(72) Inventors: Dalei Zhang, Shandong (CN); Yuhao Zhao, Shandong (CN); Yingfei Sun, Shandong (CN); Manqian Wang, Shandong (CN); Xinyu Wang, Shandong (CN); Shuang Wang, Shandong (CN)

(73) Assignee: QINGDAO TECHNOLOGY UNIVERSITY, Qingdao (CN)

( * ) Notice: Subject to any disclaimer, the term of this patent is extended or adjusted under 35 U.S.C. 154(b) by 0 days.

(21) Appl. No.: 16/206,759

(22) Filed: Nov. 30, 2018

(65) Prior Publication Data
US 2019/0091742 A1    Mar. 28, 2019

Related U.S. Application Data

(63) Continuation of application No. PCT/CN2017/086385, filed on May 27, 2017.

(30) Foreign Application Priority Data

May 30, 2016    (CN) .......................... 2016 1 0370225

(51) Int. Cl.
| | |
|---|---|
| *B09C 1/00* | (2006.01) |
| *B09C 1/08* | (2006.01) |
| *B09C 1/10* | (2006.01) |
| *C09K 17/48* | (2006.01) |

(52) U.S. Cl.
CPC ............... *B09C 1/08* (2013.01); *B09C 1/002* (2013.01); *B09C 1/10* (2013.01); *C09K 17/48* (2013.01); *B09C 2101/00* (2013.01)

(58) Field of Classification Search
CPC ............... B09C 1/00; B09C 1/08; B09C 1/10
See application file for complete search history.

(56) References Cited

U.S. PATENT DOCUMENTS

| | | | | |
|---|---|---|---|---|
| 5,562,588 A | * | 10/1996 | Higgins .................... | B09C 1/10 405/128.5 |
| 6,066,772 A | * | 5/2000 | Hater ........................ | B09C 1/10 149/124 |
| 6,719,902 B1 | * | 4/2004 | Alvarez .................. | B09C 1/002 210/170.07 |
| 8,969,422 B2 | * | 3/2015 | Zhou .......................... | C10J 3/30 518/700 |

FOREIGN PATENT DOCUMENTS

| | | | |
|---|---|---|---|
| CN | 104741373 A | | 7/2015 |
| CN | 104815844 A | | 8/2015 |
| CN | 104841693 A | | 8/2015 |
| CN | 105013810 A | | 11/2015 |
| CN | 105598148 A | | 5/2016 |
| CN | 105945050 A | | 9/2016 |
| WO | WO2007-068248 | * | 6/2007 |

* cited by examiner

*Primary Examiner* — Janine M Kreck
(74) *Attorney, Agent, or Firm* — Wayne & Ken, LLC; Tony Hom

(57) ABSTRACT

Disclosed is an in-situ detoxification method for a heavily contaminated site by hexavalent chromium. The method includes injecting a chemical reducing agent into a site heavily contaminated with hexavalent chromium, and injecting a chromium soil remediation microbial agent into the site after 0-10 days. The in-situ detoxification method includes: first, in-situ injecting the chemical reducing agent into the soil, preliminarily reducing high-concentration hexavalent chromium such that the hexavalent chromium of high concentration has no toxic effect on the subsequent ecological microbial agent, then in-situ injecting the ecological microbial agent prepared from biogas residue, a carbon source and sulfate into the chromium-containing soil under pressure, and forming a large-scale reducing buffer zone containing sulfate-reducing bacteria and sulfide in a special maintenance manner in the subsurface soil of the site to reduce the hexavalent chromium continuously and effectively.

16 Claims, No Drawings

IN-SITU DETOXIFICATION METHOD FOR HEAVILY CONTAMINATED SITE BY HEXAVALENT CHROMIUM, CHROMIUM SOIL REMEDIATION MICROBIAL AGENT AND PREPARATION METHOD THEREOF

CROSS-REFERENCE TO RELATED APPLICATIONS

This application is a continuation of International Patent Application No. PCT/CN2017/086385, filed on May 27, 2017, which claims the benefit of priority from Chinese Application No. 201610370225.5, filed on May 30, 2016. The entire contents of the aforementioned applications, including any intervening amendments thereto, are incorporated herein by reference.

TECHNICAL FIELD

The present application relates to the field of soil remediation, and in particular to an in-situ detoxification method for a site heavily contaminated with hexavalent chromium, a chromium soil remediation microbial agent and a preparation method thereof.

BACKGROUND OF THE PRESENT INVENTION

Chromium (Cr) and its compounds are the basic raw materials commonly used in metallurgy, metal processing, electroplating, tanning, paint, pigments and other industries. In the production process of the above-mentioned industries, a large amount of chromium-containing waste gas, waste water and waste residue are generated, which causes serious environmental contamination problems. Since Cr(VI) is a heavy metal that is soluble in water, and the site contaminated by Cr(VI) can be as deep as 100 meters sometimes, and how to remediate such chromium-containing soil which is heavily contaminated has always been a problem in the environmental protection field.

Although there are many treatment methods, most of them have various problems. At present, the mainstream process for treating chromium-containing soil is to reduce hexavalent chromium by using ferrous sulfate. However, ferrous sulfate is low in pH, corrosive, and is easily oxidized and deactivated in the air. Moreover, ferrous iron is easily adsorbed and intercepted by soil and has poor permeability. Therefore, the reduction of hexavalent chromium can only be short-term rather than permanent. In order to effectively treat chromium-containing soil, it is often necessary to add an excess of ferrous sulfate, which in turn tends to cause secondary pollution of sulfate radical. Patent No. 201410101586.0 describes an in situ remediation method for a Cr(VI)-containing site using ferrous sulfate. Since ferrous iron is easily oxidized and deactivated in air, the method uses citric acid with a low pH to inhibit its oxidation and increase its permeation, but correspondingly increases the cost and acidifies the soil while still causing secondary pollution of sulfate. Patent No. 201310642919.6 describes an situ remediation method for a Cr(VI)-containing site using organic waste, which is a method for treating a site contaminated with hexavalent chromium at a low cost. However, this method may easily cause the microbial agent to be intercepted in a certain section of the soil through natural permeation, which causes the microbial agent to be unable to be transported, and the organic matter and the dissolved hexavalent chromium solution are permeated into the underground water, causing secondary contamination of the underground water.

In general, for the site contaminated with a high concentration of hexavalent chromium, traditional chemical reagents are difficult to reduce all the hexavalent chromium, and the microorganism reducing microbial agents are easily killed by high-concentration hexavalent chromium to be ineffective.

SUMMARY OF THE PRESENT INVENTION

In view of the deficiencies of the prior art, a first object of the present application is to provide an in-situ detoxification method for a site heavily contaminated with hexavalent chromium to achieve efficient reduction of hexavalent chromium while saving costs.

A second object of the present application is to provide a chromium soil remediation microbial agent and a preparation method thereof, to obtain a soil remediation agent capable of effectively reducing hexavalent chromium while avoiding secondary contamination of sulfate.

In a first aspect, an example of the present application provides an in-situ detoxification method for a site heavily contaminated with hexavalent chromium based on biogas residue, which includes the following steps:

(1) mixing sodium sulfate, biogas residue or a carbon source solution, so that the mixed solution has 0.1-20% of a dry biogas residue, 0.5-25% of a solid, and 0.5-25% of an organic carbon, the mass ratio of the sulfate to the organic carbon is 0-1:1, the sulfate is designated by $SO_4^{2-}$, reacting the mixed solution for 0-5 days, carrying out wet-crushing and then passing through a mesh sieve of less than 40 meshes to obtain a chromium soil remediation microbial agent;

(2) injecting a ferrous sulfate solution into the site under pressure through an injection well, and stopping injecting the ferrous sulfate solution when the injection pressure exceeds 0.01-2 MPa;

(3) after no more than 10 days, continuously feeding the chromium soil remediation microbial agent in step (1) into the chromium-containing soil by injection under pressure through an injection well, and stopping the injection when the injection pressure exceeds 0.01-2 MPa;

(4) then repeating the injection of the chromium soil remediation microbial agent in step (1) under pressure less than every 100 days until the site remediation is up to standard, and stopping the injection each time the injection pressure exceeds 0.01-2 MPa; the formula of the injected chromium soil remediation microbial agent can be adjusted according to the range of the step (1) depending on the remediation condition of the site;

and (5) during the remediation period, the soil moisture content of the site is required to be in a range of 10-70%, and if insufficient, supplementing by spraying water onto the surface.

With reference to the first aspect, an example of the present application provides a first possible embodiment of the first aspect, wherein the biogas residue refers to solid residue formed from organic waste generated in the fields of industry, agriculture or municipal industry during anaerobic treatment.

With reference to the first aspect, an example of the present application provides a second possible embodiment of the first aspect, wherein the carbon source solution includes a solution containing alcohol, carbohydrate, protein or starch.

With reference to the first aspect, an example of the present application provides a third possible embodiment of the first aspect, wherein a step of pumping underground water from the site is further included before injecting the chromium soil remediation microbial agent.

With reference to the first aspect, an example of the present application provides a fourth possible embodiment of the first aspect, wherein the pumped underground water is mixed with the chromium soil remediation microbial agent at a volume ratio of 1-5:1-5, and then injected into the soil under pressure through an injection well, and the injection pressure is 0.01-1 MPa.

With reference to the first aspect, an example of the present application provides a fifth possible embodiment of the first aspect, wherein the mass ratio of the total cumulative amount of the organic carbon in the injected chromium soil remediation microbial agent to the total amount of hexavalent chromium in the soil is controlled to be 5-200:1, and the total cumulative amount of the organic carbon accounting for the total mass of the remediated soil in the injected chromium soil remediation microbial agent is controlled to be 0.1-5%.

With reference to the first aspect, an example of the present application provides a sixth possible embodiment of the first aspect, wherein the ferrous sulfate solution in step (2) contains organic carbon, and the content of the organic carbon is 10-10000 mg/L.

With reference to the first aspect, an example of the present application provides a seventh possible embodiment of the first aspect, wherein after the site is injected once with the ferrous sulfate solution and the chromium soil remediation microbial agent, when the average content of hexavalent chromium of the site is stabilized below 200 mg/kg, the step of injecting the chromium soil remediation microbial agent into the site is stopped.

In a second aspect, an example of the present application provides an in-situ detoxification method for a site heavily contaminated with hexavalent chromium based on biogas residue, including:

injecting a chemical reducing agent into a site heavily contaminated with hexavalent chromium, and injecting a chromium soil remediation microbial agent into the site after 0-10 days;

and the method for preparing the chromium soil remediation microbial agent includes: mixing biogas residue and a carbon source solution, and then reacting for 0-5 days.

With reference to the second aspect, an example of the present application provides a first possible embodiment of the first aspect, wherein in the preparation of the chromium soil remediation microbial agent, the mixed solution formed by the biogas residue and the carbon source solution has 0.1-20% of a biogas residue and 0.5-25% of an organic carbon.

With reference to the second aspect, an example of the present application provides a first possible embodiment of the second aspect, wherein the mixed solution further includes a sulfate, and the mass ratio of the sulfate to the organic carbon is 0.01-1:1.

With reference to the second aspect, an example of the present application provides a first possible embodiment of the third aspect, wherein the chemical reducing agent includes nano-iron or a sulfur-based reducing agent.

With reference to the second aspect, an example of the present application provides a first possible embodiment of the fourth aspect, wherein the sulfur-based reducing agent includes ferrous sulfate.

With reference to the second aspect, an example of the present application provides a first possible embodiment of the fifth aspect, wherein the method for injecting the chemical reducing agent or the chromium soil remediation microbial agent into the site is by employing a method of injection under pressure through an injection well.

With reference to the second aspect, an example of the present application provides a first possible embodiment of the sixth aspect, wherein after injecting the chromium soil remediation microbial agent into the site, a step of repeating the injection of the chromium soil remediation microbial agent every 0.1-100 days is further included.

With reference to the second aspect, an example of the present application provides a first possible embodiment of the seventh aspect, wherein the site has 10-70% of soil moisture from beginning injecting the chemical reducing agent till the site remediation is up to standard.

In a third aspect, an example of the present application provides a method for preparing a chromium soil remediation microbial agent based on biogas residue, including: mixing biogas residue and a carbon source solution, and then reacting for 0-5 days.

With reference to the third aspect, an example of the present application provides a possible embodiment of the third aspect, the mixed solution formed by the biogas residue and the carbon source solution has 0.1-20% of a biogas residue and 0.5-25% of an organic carbon.

In a fourth aspect, an example of the present application provides a chromium soil remediation microbial agent based on biogas residue prepared by the above method.

Compared with the prior art, the beneficial effects of the present application include, for example:

according to the detoxification method, the site heavily contaminated with hexavalent chromium is first turned into a lightly contaminated site by a chemical reduction method, then injected with a special ecological agent in situ and subjected to special site construction and maintenance, to promote the formation of a flora mainly composed of sulfate-reducing bacteria and iron-reducing bacteria on a large scale in the site. The flora can effectively reduce hexavalent chromium using a carbon source at first, and simultaneously reduce the surrounding ferric iron and sulfate to form ferrous iron and sulfide, which converts trivalent chromium into a more stable chromium sulfide precipitate while effectively reducing hexavalent chromium, and the flora adheres to a relatively easily permeated zone of the soil, forming a large-scale reducing zone, which can continuously reduce the hexavalent chromium slowly permeated in the low permeability zone.

The present application includes the following advantages over conventional treatment methods of chromium-containing soil:

1. The sulfate-reducing flora cultivated in this application is an indigenous flora, which has strong natural tolerance, is easy to multiply on a large scale in the site, and can permanently and efficiently reduce the hexavalent chromium without causing ecological problems.

2. The sulfate-reducing bacteria in the chromium soil remediation microbial agent reduces the sulfate of ferrous sulfate to form a sulfide, which avoids secondary contamination of the sulfate while more effectively reducing hexavalent chromium.

3. The principle of reducing hexavalent chromium by the chromium soil remediation microbial agent is as follows: (1), the sulfate-reducing bacteria itself has the property of using a carbon source to reduce hexavalent chromium, but has a slow reaction; and (2), the metabolite hydrogen sulfide of the sulfate-reducing bacteria itself can reduce hexavalent chromium, and has a very rapid reaction since its reduction of hexavalent chromium is a chemical reaction, which is the reason why the ecological microbial agent can efficiently treat chromium-containing soil compared to other microbial agents.

4. The reduced trivalent chromium and the metabolite sulfide of the sulfate-reducing bacteria form a chromium sulfide precipitate, making the trivalent chromium in the soil more stable, which is significantly better than other biochemical processes.

5. Due to the presence of biogas residue and carbon source, a reducing atmosphere is formed in a zone with a high permeability coefficient in the site, which reduces the ferric iron after oxidation to ferrous iron, and reduces the sulfate to a sulfide to form a large-scale reducing zone. When hexavalent chromium gradually permeates from the hard-to-permeate zone, the hexavalent chromium passing through the permeable zone is effectively reduced to trivalent chromium.

6. The method uses biogas residue and organic waste as the main raw materials, and remediates the site in situ, which greatly reduces the cost.

7. This process combines the advantages of chemical reduction method and biological reduction method, which rapidly reduces hexavalent chromium using a chemical reduction method at first to make the heavily contaminated site be lightly contaminated, which lays a foundation for the subsequent stable reduction of hexavalent chromium by microorganisms.

DETAILED DESCRIPTION OF THE PRESENT INVENTION

The present application will be further described below in conjunction with specific embodiments.

An in-situ detoxification method for a site heavily contaminated with hexavalent chromium based on biogas residue, which includes the following steps:

(1) sodium sulfate, biogas residue or a carbon source solution was mixed, so that the mixed solution had 0.1-20% of a dry biogas residue, 0.5-25% of a solid, and 0.5-25% of an organic carbon, the mass ratio of the sulfate to the organic carbon was 0-1:1, the sulfate was designated by $SO_4^{2-}$, the mixed solution was reacted for 0-5 days, wet-crushing was carried out and then passed through a mesh sieve of with mesh number of more than 40 to obtain a chromium soil remediation microbial agent; the mesh sieve with mesh number of more than 40 herein refers to a mesh sieve with mesh number of 40-1000;

(2) a ferrous sulfate solution was injected into the site under pressure through an injection well, and the ferrous sulfate solution was stopped being injected when the injection pressure exceeded 0.01-2 MPa;

(3) after no more than 10 days, the chromium soil remediation microbial agent in step (1) was continuously fed into the chromium-containing soil by injection under pressure through an injection well, and the injection was stopped when the injection pressure exceeded 0.01-2 MPa;

(4) then the injection of the chromium soil remediation microbial agent in step (1) was repeated under pressure less than every 100 days until the site remediation was up to standard, and the injection was stopped each time the injection pressure exceeded 0.01-2 MPa; the formula of the injected chromium soil remediation microbial agent could be adjusted according to the range of the step (1) depending on the remediation condition of the site;

and (5) during the remediation period, the soil moisture content of the site was required to be in a range of 10-70%, and if insufficient, it was supplemented by spraying water onto the surface.

Optionally, the biogas residue refers to solid residue formed from organic waste generated in the fields of industry, agriculture or municipal industry during anaerobic treatment.

Optionally, the carbon source solution included a solution containing alcohol, carbohydrate, protein or starch.

Further, before the chromium soil remediation microbial agent was injected, a step of pumping underground water from the site was further included.

Optionally, the pumped underground water was mixed with the chromium soil remediation microbial agent at a volume ratio of 1-5:1-5, and then injected into the soil under pressure through an injection well, and the injection pressure was 0.01-1 MPa.

Optionally, the mass ratio of the total cumulative amount of the organic carbon in the injected chromium soil remediation microbial agent to the total amount of hexavalent chromium in the soil was controlled to be 5-200:1, and the total cumulative amount of the organic carbon accounting for the total mass of the remediated soil in the injected chromium soil remediation microbial agent was controlled to be 0.1-5%.

Optionally, the ferrous sulfate solution in step (2) contained organic carbon, and the content of the organic carbon was 10-10000 mg/L.

Optionally, after the site was injected once with the ferrous sulfate solution and the chromium soil remediation microbial agent, when the average content of the hexavalent chromium of the site was stabilized below 200 mg/kg, the step of injecting the chromium soil remediation microbial agent into the site was stopped.

An in-situ detoxification method for a site heavily contaminated with hexavalent chromium based on biogas residue, which includes:

a chemical reducing agent was injected into a site heavily contaminated with hexavalent chromium, and a chromium soil remediation microbial agent was injected into the site after 0-10 days;

and the method for preparing the chromium soil remediation microbial agent includes: biogas residue and a carbon source solution were mixed, and were then reacted for 0-5 days.

Further, in the preparation of the chromium soil remediation microbial agent, the mixed solution formed by the biogas residue and the carbon source solution had 0.1-20% of a biogas residue and 0.5-25% of an organic carbon.

Optionally, the mixed solution further included a sulfate, and the mass ratio of the sulfate to the organic carbon was 0.01-1:1.

Optionally, the chemical reducing agent included nanoiron, or a sulfur-based reducing agent.

Optionally, the sulfur-based reducing agent included ferrous sulfate.

Optionally, the method for injecting the chemical reducing agent or the chromium soil remediation microbial agent into the site is injecting under pressure through an injection well.

Further, after the chromium soil repairing agent was injected into the site, a step of repeating the injection of the chromium soil remediation microbial agent every 0.1-100 days was further included.

Optionally, when the pressure of the injection well was in a range of 0.01-2 MPa, the injection of the chemical reducing agent or the chromium soil remediation microbial agent into the site was stopped.

Optionally, the site had 10-70% of soil moisture from beginning injecting the chemical reducing agent till the site remediation was up to standard.

A method for preparing a chromium soil remediation microbial agent based on biogas residue includes: biogas residue and a carbon source solution were mixed, and then were reacted for 0-5 days.

Further, the mixed solution formed by the biogas residue and the carbon source solution had 0.1-20% of a biogas residue and 0.5-25% of an organic carbon.

A chromium soil remediation microbial agent based on biogas residue prepared by the method according to claim 18 or 19.

Example 1

The example provides an in-situ detoxification method for a site heavily contaminated with hexavalent chromium based on biogas residue, which includes the following steps:

(1) Sodium sulfate, biogas residue and a carbon source solution were mixed according to a certain ratio, so that the mixed solution had 20% of a dry biogas residue, 25% of a solid, and 25% of an organic carbon. The mass ratio of the sulfate (designated by $SO_4^{2+}$) to the organic carbon was 1:1. The mixed solution was reacted for 5 days to obtain a chromium soil remediation agent.

(2) A ferrous sulfate solution was injected into the site under pressure through an injection well. When the injection pressure was 0.01 MPa, the injection of the ferrous sulfate solution was stopped.

(3) After 0.1 day, the chromium soil remediation agent in step (1) was continuously fed into the chromium-containing soil by injection under pressure through an injection well. When the injection pressure was 0.01 MPa, the injection was stopped.

(4) During the remediation period, the soil moisture content of the site was required to be in a range of 10%. If it was insufficient, it was supplemented by spraying water onto the surface. After 100 days of remediation, the hexavalent chromium content of the soil in the site was less than 20 mg/kg, and the hexavalent chromium content of underground water was less than 0.1 mg/L.

Example 2

The example provides an in-situ detoxification method for a site heavily contaminated with hexavalent chromium based on biogas residue, which includes the following steps:

(1) Biogas residue and a carbon source solution were mixed according to a certain ratio, so that the mixed solution had 0.1% of a dry biogas residue, a 0.5% of a solid, and 0.5% of an organic carbon. A chromium soil remediation agent was obtained after mixing.

(2) A ferrous sulfate solution was injected into the site under pressure through an injection well. When the injection pressure was 2 MPa, the injection of the ferrous sulfate solution was stopped.

(3) After 5 days, the chromium soil remediation agent in step (1) was continuously fed into the chromium-containing soil by injection under pressure through an injection well. When the injection pressure was 2 MPa, the injection was stopped.

(4) During the remediation period, the soil moisture content of the site was required to be in a range of 50%. If it was insufficient, it was supplemented by spraying water onto the surface. After 100 days of remediation, the hexavalent chromium content of the soil in the site was less than 18 mg/kg, and the hexavalent chromium content of underground water was less than 0.09 mg/L.

Example 3

The example provides an in-situ detoxification method for a site heavily contaminated with hexavalent chromium based on biogas residue, which includes the following steps:

(1) Sodium sulfate, biogas residue and carbon source solution were mixed according to a certain ratio, so that the mixed solution 10% of a dry biogas residue, 15% of a solid, and 15% of an organic carbon. The mass ratio of the sulfate (designated by $SO_4^{2+}$) to the organic carbon was 0.5:1. The mixed solution was reacted for 2 days, wet-crushed and then passed through a mesh sieve of 200 meshes to obtain a chromium soil remediation agent.

(2) A ferrous sulfate solution was injected into the site under pressure through an injection well. When the injection pressure was 0.5 MPa, the injection of the ferrous sulfate solution was stopped.

(3) After 10 days, the chromium soil remediation agent in step (1) was continuously fed into the chromium-containing soil by injection under pressure through an injection well. When the injection pressure was 0.5 MPa, the injection was stopped.

(4) During the remediation period, the soil moisture content of the site was required to be in a range of 70%. If it was insufficient, it was supplemented by spraying water onto the surface.

After 20 days of remediation, the hexavalent chromium content of the soil in the site was rapidly reduced from 3084 mg/kg to 15 mg/kg. After 150 days of remediation, the hexavalent chromium content of the soil in the site was less than 2 mg/kg, and the hexavalent chromium content of underground water was less than 0.1 mg/L.

Example 4

The example provides a chromium soil remediation agent based on biogas residue, and the preparation method thereof includes:

sodium sulfate, biogas residue and carbon source solution were mixed, so that the mixed solution 10% of a dry biogas residue, 15% of a solid, and 15% of an organic carbon. The mass ratio of the sulfate (designated by $SO_4^{2+}$) to the organic carbon was 0.5:1. The mixed solution was reacted for 2 days, wet-crushed and then was passed through a mesh sieve of 100 meshes to obtain a chromium soil remediation agent.

The example provides an in-situ detoxification method for a site heavily contaminated with hexavalent chromium based on biogas residue, which includes the following steps:

(1) A ferrous sulfate solution was injected into the site under pressure through an injection well. When the injection pressure was 1 MPa, the injection of the ferrous sulfate solution was stopped.

(2) After 2 days, the prepared chromium soil remediation microbial agent was continuously fed into the chromium-containing soil by injection under pressure through an injection well. When the injection pressure was 1 MPa, the injection was stopped.

(3) Subsequently, the injection under pressure was repeated every 10 days. The injection was stopped each time the injection pressure was 0.5 MPa. After two repeated injections, it was injected once every 20 days. At the same time, underground water was pumped. The injected agent was replaced by an agent in which the underground water and the chromium soil remediation microbial agent were mixed by a volume ratio of 1:1. The injection was stopped each time the injection pressure was 0.5 MPa.

(4) During the remediation period, the soil moisture content of the site was required to be in a range of 50%. If it was insufficient, it was supplemented by spraying water onto the surface. After 20 days of remediation, the hexavalent chromium content of the soil in the site was rapidly reduced from 2014 mg/kg to 15 mg/kg. After 200 days of remediation, the hexavalent chromium content of the soil in the site was less than 2 mg/kg, and the hexavalent chromium content of underground water was less than 0.1 mg/L.

Example 5

The example provides a chromium soil remediation agent based on biogas residue, and the preparation method thereof includes:

biogas residue and carbon source solution were mixed, so that the mixed solution had 0.1% of a dry biogas residue, and 0.5% of an organic carbon. After mixing, the mixture was wet-crushed and passed through a mesh sieve of 40 meshes to obtain a chromium soil remediation agent.

The example provides an in-situ detoxification method for a site heavily contaminated with hexavalent chromium based on biogas residue, which includes the following steps:

(1) A nano-iron solution was injected into the site under pressure through an injection well. When the injection pressure was 1.5 MPa, the injection of the nano-iron solution was stopped.

(2) After 5 days, the prepared chromium soil remediation microbial agent was continuously fed into the chromium-containing soil by injection under pressure through an injection well. When the injection pressure was 1.5 MPa, the injection was stopped.

(3) Subsequently, the injection under pressure was repeated every 10 days. The injection was stopped each time the injection pressure was 0.5 MPa. After two repeated injections, it was injected once every 30 days. At the same time, underground water was pumped.

The injected agent was replaced by an agent in which the underground water and the chromium soil remediation microbial agent were mixed by a volume ratio of 1:5. The injection was stopped each time the injection pressure was 1 MPa.

(4) During the remediation period, the soil moisture content of the site was required to be in a range of 50%. If it was insufficient, it was supplemented by spraying water onto the surface. After 25 days of remediation, the hexavalent chromium content of the soil in the site was rapidly reduced from 6015 mg/kg to 16 mg/kg. After 200 days of remediation, the hexavalent chromium content of the soil in the site was less than 2 mg/kg, and the hexavalent chromium content of underground water was less than 0.1 mg/L.

Example 6

The example provides a chromium soil remediation agent based on biogas residue, and the preparation method thereof includes:

sodium sulfate, biogas residue and carbon source solution were mixed, so that the mixed solution had 20% of a dry biogas residue, and 25% of an organic carbon. The mass ratio of the sulfate (designated by $SO_4^{2+}$) to the organic carbon was 0.1:1. The mixed solution was reacted for 5 days, wet-crushed and then passed through a mesh sieve of 40 meshes to obtain a chromium soil remediation agent.

The example provides an in-situ detoxification method for a site heavily contaminated with hexavalent chromium based on biogas residue, which includes the following steps:

(1) A ferrous sulfate solution was injected into the site under pressure through an injection well. When the injection pressure was 0.1 MPa, the injection of the ferrous sulfate solution was stopped.

(2) After 8 days, the prepared chromium soil remediation microbial agent was continuously fed into the chromium-containing soil by injection under pressure through an injection well. When the injection pressure was 0.1 MPa, the injection was stopped.

(3) Subsequently, the injection under pressure was repeated every 8 days. The injection was stopped each time the injection pressure was 0.1 MPa. After two repeated injections, it was injected once every 25 days. At the same time, underground water was pumped. The injected agent was replaced by an agent in which the underground water and the chromium soil remediation microbial agent were mixed by a volume ratio of 5:1. The injection was stopped each time the injection pressure was 0.1 MPa.

(4) During the remediation period, the soil moisture content of the site was required to be in a range of 50%. If it was insufficient, it was supplemented by spraying water onto the surface. After 200 days of remediation, the hexavalent chromium content of underground water was less than 0.08 mg/L.

The above examples are only used to illustrate the technical solutions of the present invention, and are not limited thereto. Although the present invention has been described in detail with reference to the foregoing examples, those skilled in the art may still modify the technical solutions described in the foregoing examples, or equivalently replace some technical features thereto, and these modifications or replacements do not depart from the spirit and scope of the technical solutions claimed in the present invention.

The present application has the following industrial applicability: according to the detoxification method, the site heavily contaminated with hexavalent chromium is first turned into a lightly contaminated site by a chemical reduction method, then injected with a special ecological agent in situ and subjected to special site construction and maintenance, to promote the formation of a flora mainly composed of sulfate-reducing bacteria and iron-reducing bacteria on a large scale in the site. The flora can firstly use a carbon source to effectively reduce hexavalent chromium, and simultaneously reduce the surrounding ferric iron and sulfate to form ferrous iron and sulfide, which converts trivalent chromium into a more stable chromium sulfide precipitate while effectively reducing hexavalent chromium, and adheres to a relatively easily permeated zone of the soil, forming a large-scale reducing zone, which can continuously reduce the hexavalent chromium slowly permeated in the low permeability zone, thereby performing soil remediation at a site heavily contaminated with hexavalent chromium.

What is claimed is:

1. An in-situ detoxification method for a heavily contaminated site by hexavalent chromium based on biogas residue, comprising:

(1) mixing sodium sulfate, the biogas residue and a carbon source solution to obtain a mixture, wherein based on the mixture, a content of a dry biogas residue is 0.1-20%, a solid content is 0.5-25%, an organic carbon content is 0.5-25%, and a mass ratio of the sulfate to the organic carbon is 0-1:1; the sulfate is designated by $SO_4^{2-}$, reacting the mixed solution for 0-5 days; carrying out wet-crushing and then passing through a sieve with mesh number of 40-1000 to obtain a chromium soil remediation microbial agent;

(2) injecting a ferrous sulfate solution into the site by pressure pressurized injection through an injection well; and stopping injecting the ferrous sulfate solution when an injection pressure exceeds 0.01-2 MPa;

(3) after no more than 10 days, continuously feeding the chromium soil remediation microbial agent in step (1) into the chromium-containing soil by injection under pressure through an injection well, and stopping the injection when the injection pressure exceeds 0.01-2 MPa;

(4) repeating the injection of the chromium soil remediation microbial agent in step (1) under pressure less than every 100 days until the site remediation is up to standard, and stopping the injection each time the injection pressure exceeds 0.01-2 MPa; the formula of the injected chromium soil remediation microbial agent can be adjusted according to the range of the step (1) depending on the remediation condition of the site; and (5) during the remediation period, the soil moisture content of the site is required to be in a range of 10-70%, and if insufficient, supplementing by spraying water onto the surface.

2. The method of claim 1, characterized in that the biogas residue comprises solid residue formed from organic waste generated in the fields of industry, agriculture or municipal industry during anaerobic treatment.

3. The method of claim 1, characterized in that the carbon source solution comprises a solution containing alcohol, carbohydrate, protein or starch.

4. The method of claim 1, further comprising a step of pumping underground water from the site before injecting the chromium soil remediation microbial agent.

5. The method of claim 4, wherein the pumped underground water is mixed with the chromium soil remediation microbial agent at a volume ratio of 1-5:1-5, and then injected into the soil under pressure through an injection well, and an injection pressure is 0.01-1 MPa.

6. The method of claim 1, wherein a mass ratio of the total cumulative amount of the organic carbon in the injected chromium soil remediation microbial agent to the total amount of hexavalent chromium in the soil is controlled to be 5-200:1, and the total cumulative amount of the organic carbon accounting for the total mass of the remediated soil in the injected chromium soil remediation microbial agent is controlled to be 0.1-5%.

7. The method of claim 1, wherein the ferrous sulfate solution in step (2) contains organic carbon, and the content of the organic carbon is 10-10000 mg/L.

8. The method of claim 1, after the site is injected once with the ferrous sulfate solution and the chromium soil remediation microbial agent, when the average content of hexavalent chromium of the site is stabilized below 200 mg/kg, stopping injecting the chromium soil remediation microbial agent into the site.

9. An in-situ detoxification method for a heavily contaminated site by hexavalent chromium based on biogas residue, comprising:
 injecting a chemical reducing agent into a heavily contaminated site by hexavalent chromium; and
 injecting a chromium soil remediation microbial agent into the site after 0-10 days;
 preparing the chromium soil remediation microbial agent by mixing biogas residue and a carbon source solution, and then reacting for 0-5 days.

10. The method of claim 9, wherein in the preparation of the chromium soil remediation microbial agent, the mixed solution formed by the biogas residue and the carbon source solution has 0.1-20% of a biogas residue and 0.5-25% of an organic carbon.

11. The method of claim 10, wherein the mixed solution further comprises a sulfate, and the mass ratio of the sulfate to the organic carbon is 0.01-1:1.

12. The method of claim 9, wherein the chemical reducing agent comprises nano-iron, or a sulfur-based reducing agent.

13. The method of claim 12, wherein the sulfur-based reducing agent comprises ferrous sulfate.

14. The method of claim 9, wherein the method for injecting the chemical reducing agent or the chromium soil remediation microbial agent into the site is by employing a method of injection under pressure through an injection well.

15. The method of claim 14, further comprising a step of repeating the injection of the chromium soil remediation microbial agent every 0.1-100 days after injecting the chromium soil remediation microbial agent into the site.

16. The method of claim 9, wherein the site has 10-70% of soil moisture from beginning injecting the chemical reducing agent till the site remediation is up to standard.

\* \* \* \* \*